United States Patent
Oshima et al.

(10) Patent No.: US 10,374,460 B2
(45) Date of Patent: Aug. 6, 2019

(54) WIRELESS POWER TRANSFER SYSTEM AND WIRELESS POWER TRANSFER METHOD

(71) Applicant: FUJITSU LIMITED, Kawasaki-shi, Kanagawa (JP)

(72) Inventors: Hirotaka Oshima, Machida (JP); Kazuyuki Ozaki, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/277,315

(22) Filed: Sep. 27, 2016

(65) Prior Publication Data

US 2017/0018971 A1    Jan. 19, 2017

Related U.S. Application Data

(63) Continuation of application No. PCT/JP2014/059444, filed on Mar. 31, 2014.

(51) Int. Cl.
*H01F 27/42* (2006.01)
*H01F 37/00* (2006.01)
(Continued)

(52) U.S. Cl.
CPC .............. *H02J 50/12* (2016.02); *H01F 38/14* (2013.01); *H02J 7/025* (2013.01); *H02J 50/10* (2016.02); *H02J 50/90* (2016.02)

(58) Field of Classification Search
CPC .. H02J 50/12; H02J 50/90; H02J 5/005; H02J 7/025; H02J 50/00; H01F 38/14; H04B 5/0037; Y02T 90/122
See application file for complete search history.

(56) References Cited

U.S. PATENT DOCUMENTS

2011/0181120 A1*  7/2011  Liu ................. H01F 38/14
                                                307/104
2012/0169139 A1   7/2012  Kudo

FOREIGN PATENT DOCUMENTS

JP    2002-510096 A1    4/2002
JP    2002510096 A  *   4/2002
(Continued)

OTHER PUBLICATIONS

H. Shoki, et al.; "Standardization Trends on Wireless Power Transmission;" IEICE Technical Report, WPT2011-19; Dec. 2011 (6 Sheets)/p. 2 of specification.
(Continued)

*Primary Examiner* — Rexford N Barnie
*Assistant Examiner* — Rasem Mourad
(74) *Attorney, Agent, or Firm* — Kratz, Quintos & Hanson, LLP (57) ABSTRACT

A wireless power transfer system includes a first transmitter coil, a second transmitter coil and a third transmitter coil arranged such that normal directions to planes of the first, the second and the third transmitter coils are orthogonal to each other in a three-dimensional space, and a controller that controls electric currents supplied to the first, the second and the third transmitter coils such that a synthetic magnetic field vector produced by the first, the second and the third transmitter coils rotates in a plane of rotation at a first angular frequency "ω", and that a normal vector to the plane of rotation rotates about an axis of rotation perpendicular to the normal vector at a second angular frequency "a" equal to or smaller than the first angular frequency (a≤ω).

14 Claims, 8 Drawing Sheets

(51) Int. Cl.
  *H01F 38/00* (2006.01)
  *H02J 50/12* (2016.01)
  *H02J 50/10* (2016.01)
  *H02J 50/90* (2016.01)
  *H02J 7/02* (2016.01)
  *H01F 38/14* (2006.01)

(56) References Cited

FOREIGN PATENT DOCUMENTS

| | | |
|---|---|---|
| JP | 2008-283791 A1 | 11/2008 |
| JP | 2013-005591 A1 | 1/2013 |
| JP | 2013-123276 A1 | 6/2013 |
| JP | 2013-247718 A1 | 12/2013 |
| JP | 2014-017916 A1 | 1/2014 |
| WO | WO 2011/077488 A1 | 6/2011 |

OTHER PUBLICATIONS

T. Ishida, et al.; "A seamless WPT system insensitive to angle of power receiving resonator;" IEICE Technical Report, WPT 2012-04; May 2012 (20 Sheets)/p. 2 of specification.

A. Uchida, et al.; "Phase and Intensity Control of Multiple Coil Currents in Mid-range Wireless Power Transfer;" Microwave Workshop Series on Innovative Wireless Power Transmission: Technologies, Systems, and Applications (IMWS); 2012 IEEE MTT-S International (21 Sheets)/pp. 2-3 of specification.

International Search Report for International Application No. PCT/JP2014/059444 dated May 13, 2014.

Written Opinion of the International Searching Authority for International Application No. PCT/JP2014/059444 dated May 13, 2014 (3 Sheets, 2 Sheets translation; 5 Sheets total).

* cited by examiner

WIRELESS POWER TRANSFER SYSTEM AND WIRELESS POWER TRANSFER METHOD

CROSS REFERENCE TO RELATED APPLICATIONS

This application is a continuation application filed under 35 U.S.C. 111(a) claiming benefit of priority of PCT International Application No. PCT/JP2014/059444 filed Mar. 31, 2014 and designating the United States, which is incorporated herein by reference in its entirety.

FIELD

The present invention relates to a wireless power transfer system and a wireless power transfer method.

BACKGROUND

In recent years, wireless power transfer technique has been attracting attention, which technique allows electric power or energy to be transferred without using physical wires or cables. In transferring power of several watts or more to a distance of several centimeter to several tens centimeter, electromagnetic induction or coupling is typically used by providing coils in a power transmitter and a power receiver. Especially, power transfer technique making use of magnetic resonance is highly expected to wirelessly supply electric power to multiple power receivers, or to a receiver that takes three-dimensional dynamic postures. See, for example, Non-Patent Document 1 listed below.

An example of magnetic resonant wireless power transfer system that can deal with three-dimensional dynamic postures is one designed for supplying power to a capsule endoscope inserted in the body of a person being treated. This wireless power transfer system has a detector to collect information about the configuration state of a power receiver, a memory unit to store data of the magnetic field emitted from a power transmitter, and a controller to selectively drive one or more power transmitters via one or more drivers. See, for example, Patent Document 1 listed below.

Figure 1:
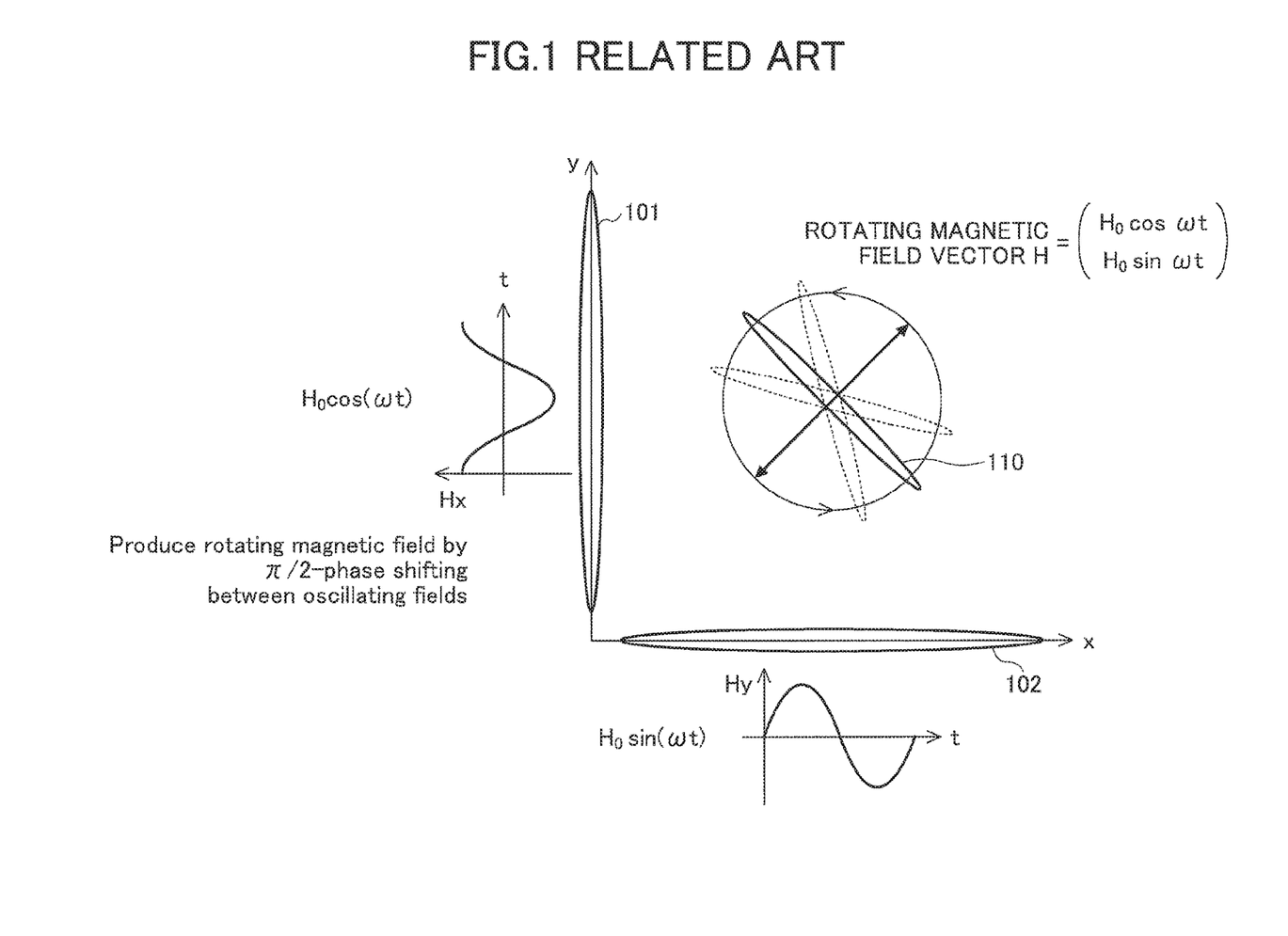
FIG. 1 is a diagram explaining wireless power transfer insensitive to the angle of a receiver coil by producing a rotating magnetic field in a two-dimensional plane.

Another known technique is to produce a rotating magnetic field in an x-y plane using two transmitter coils 101 and 102, as illustrated in FIG. 1. The transmitter coils 101 and 102 are arranged such that the normal vectors of these two coils point in the x direction and the y direction, respectively. By shifting the phases of the oscillating magnetic fields produced by the transmitter coils 101 and 102 from each other by $\pi/2$ radians (90 degrees), the resulting synthetic magnetic field becomes the rotating field in the x-y plane. See, for example, Non-Patent Document 2 or Non-Patent Document 3 listed below.

LISTING OF PRIOR ART DOCUMENTS

Non-Patent Document 1: SHOKI Hiroki et al., "Standardization Trends on wireless power transmission", IEICE Technical Report, WPT2011-19, December 2011.
Non-Patent Document 2: ISHIDA Tetsuya et al., "Seamless WPT system insensitive to angle of power receiving resonator", IEICE Technical Report WPT 2012-04, May 2012
Non-Patent Document 3: Uchida Akiyoshi et al., "Phase and intensity control of multiple coil currents in mid-range wireless power transfer", Microwave Workshop Series on Innovative Wireless Power Transmission: Technologies, Systems, and Applications (IMWS), 2012 IEEE MTT-S International, pp. 53-56.
Patent Document 1: Japanese Laid-open Patent Publication 2008-283791

SUMMARY

By producing a rotating magnetic field as illustrated in FIG. 1, the transfer efficiency can be made insensitive to the angle of the plane of the receiver coil. However, the permissible directions of the normal vector of the receiver coil are limited within a two-dimensional plane (e.g., the x-y plane in FIG. 1) and three-dimensional dynamic change in posture cannot be dealt with.

It is desired to provide a wireless power transfer system capable of transferring a certain level of electric power regardless of the three-dimensional dynamic posture of a receiver coil.

According to an aspect of the invention, a wireless power transfer system includes a first transmitter coil, a second transmitter coil, and a third transmitter coil arranged such that normal directions to the planes of the first, the second and the third transmitter coils are orthogonal to each other in a three-dimensional space, and a controller that controls electric currents supplied to the first transmitter coil, the second transmitter coil and the third transmitter coil such that a synthetic magnetic field vector produced by the first transmitter coil, the second transmitter coil and the third transmitter coil rotates in a plane of rotation at a first angular frequency $\omega$, and that a normal vector to the plane of rotation rotates about an axis of rotation perpendicular to the normal vector at a second angular frequency "a" equal to or smaller than the first angular frequency ($a \leq \omega$).

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

Figure 2:
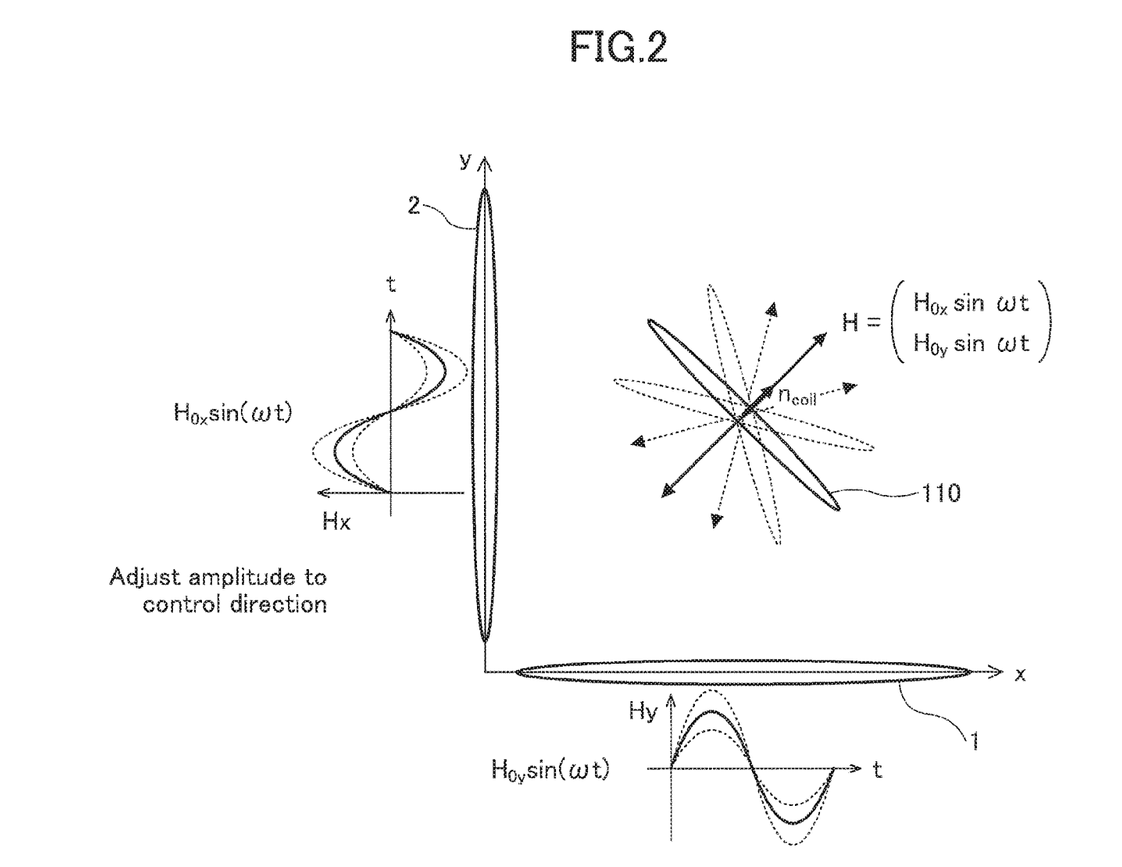
FIG. 2 is a diagram explaining control on an oscillating magnetic field responsive to the posture of the receiver coil.

In the circumstances where a power receiver changes its posture from moment to moment as in a mobile terminal, the position and orientation information of the receiver coil has to be detected every moment responsive to the change in the posture and reported to a power transmitter. The power transmitter controls power transmission driver every time according to the position and orientation information. Without such monitoring and controlling scheme, the power supply efficiency becomes zero when the receiving plane of a receiver coil 110 illustrated in FIG. 2 becomes parallel to the direction of the oscillating magnetic field vector H, namely when the normal vector $n_{coil}$ of the receiver coil 110 becomes perpendicular to the oscillating magnetic field vector H.

In order to follow the three-dimensional dynamic change in posture of a power receiver, a detector capable of detecting in real time the position and orientation of the power receiver and a drive controller for a power transmitter are needed. Adding, developing or installing such devices involves large expenses.

In the embodiment, three transmitter coils are placed such that the normal vectors of the transmitter coils are orthogonal to each other (e.g., pointing x direction, y direction and z direction), and a generated synthetic magnetic vector H is controlled three-dimensionally. By regulating the amplitude and the phase of each component of the synthetic magnetic field vector H, power can be transferred and received at a constant level, regardless of the three-dimensional posture or orientation of the receiver coil. The expression "orthogonal to each other" or "pointing x direction, y direction, and z direction" does not intend strict orthogonality or exact agreement with the x, y and z directions, but implies positional error or variation in installation of the transmitter coils. When applying the structure and the method of the embodiment to magnetic resonance coupling, it is permissible for the normal vector of each transmitter coil to slightly deviate from the x, y, or z direction.

Generation of a rotating magnetic field within a two-dimensional plane illustrated in FIG. 1 cannot be simply extended to three-dimensional control. Some more technical contrivance is needed to achieve a wireless power transfer system insensitive to three-dimensional dynamic posture of a receiver coil. The basic idea and the structure of the wireless power transfer system of the present invention are explained in detail below.

First Embodiment

Figure 3:
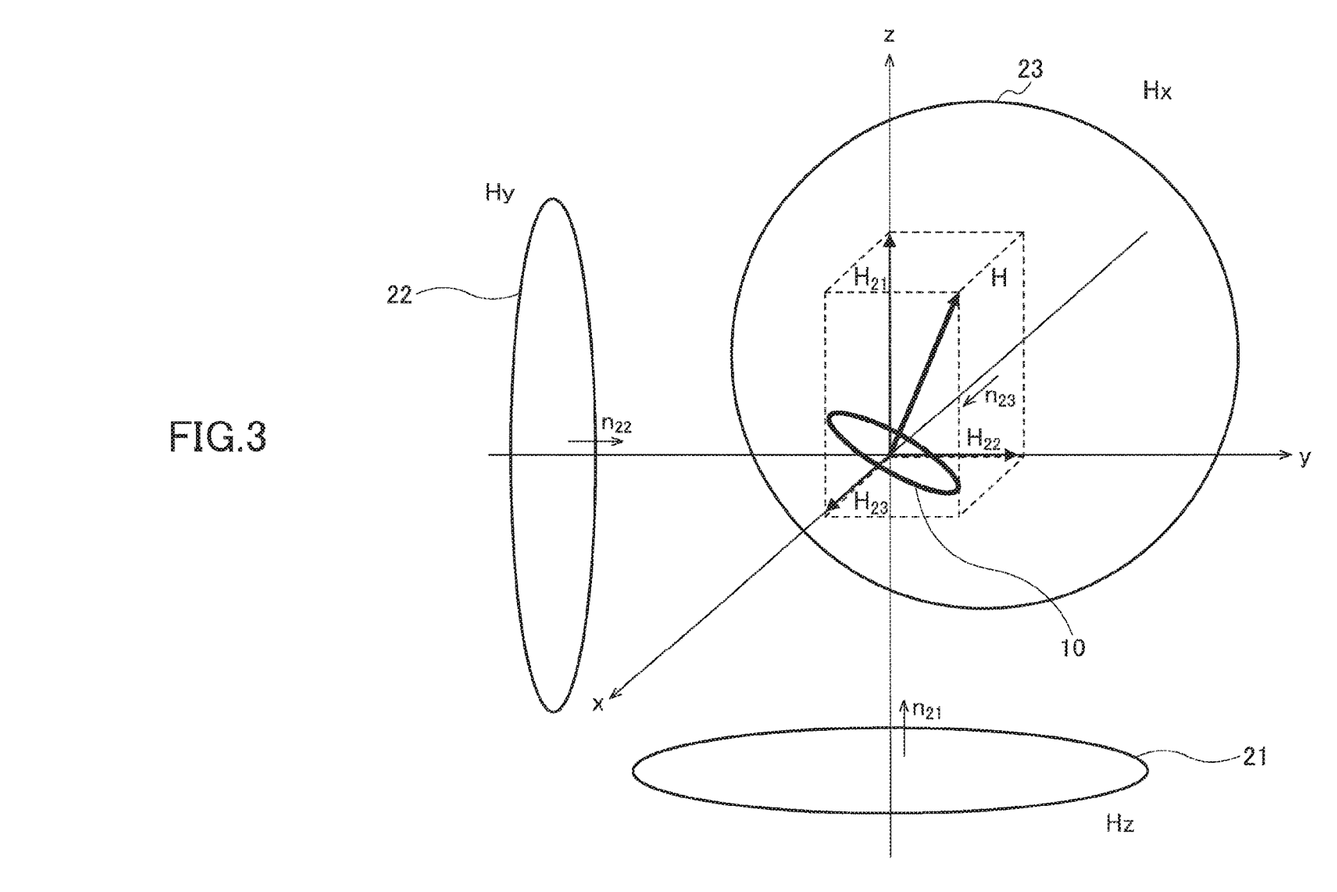
FIG. 3 illustrates a synthetic magnetic field generated by three transmit coils.

FIG. 3 illustrates a synthetic magnetic field produced using three transmit coils 21, 22 and 23. The transmitter coil 21 is arranged such that the normal vector $n_{21}$ points the z direction, which coil generates a magnetic field $H_{21}$. The transmitter coil 22 is arranged such that the normal vector $n_{22}$ points the y direction, which coil generates a magnetic field $H_{22}$. The transmitter coil 23 is arranged such that the normal vector $n_{23}$ points the x direction, which coil generates magnetic field $H_{23}$.

When transferring energy by electromagnetic induction, electric current flows in a receiver coil 10 by electromotive force when magnetic field fluxes represented by a synthetic magnetic field vector H generated by the magnetic fields $H_{21}$, $H_{21}$ and $H_{23}$ penetrate the plane of the receiver coil 10. However, when the synthetic magnetic field vector H becomes parallel to the plane of the receiver coil 10, electric energy cannot be transferred to the receiver coil. Similarly, with magnetic resonance coupling, electric current flows in the receiver coil 10 when resonating energy (i.e., oscillation of the synthetic magnetic field) passes through the plane of the receiver coil 10. However, when the direction of the resonating energy becomes parallel to the plane of the receiver coil 10, no electric current is induced.

The inventor conceived that, by keeping on rotating the synthetic magnetic field vector H in a three-dimensional manner, a stable level of electric power or energy can be transferred regardless of change in the three-dimensional posture of the receiver coil. Under continuous rotation or changing of the synthetic magnetic field vector H, the magnetic field flux penetrating the plane of the receiver coil becomes constant over a certain period of time. This technical concept is supported by general formula representing electromotive force V.

$$V = -\mu_0 \frac{d}{dt} \int H \cdot dS$$

where $\mu_0$ denotes the magnetic permeability of a vacuum (free space) and dS denotes the area of the plane of the coil.

As long as a magnetic field vector changes at a certain velocity, the time derivative of the magnetic field does not become zero.

Figure 4A:
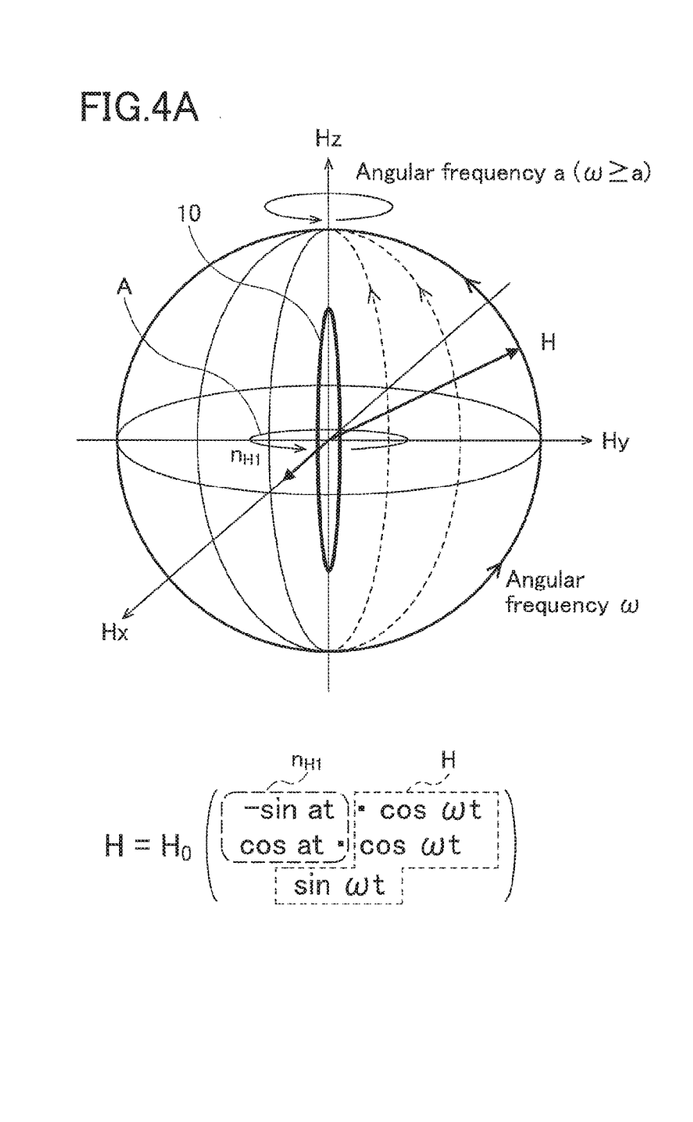
FIG. 4A is a diagram explaining the basic idea of three-dimensional control on the synthetic magnetic field to achieve power reception insensitive to the angle or orientation of the receiver coil.
Figure 4B:
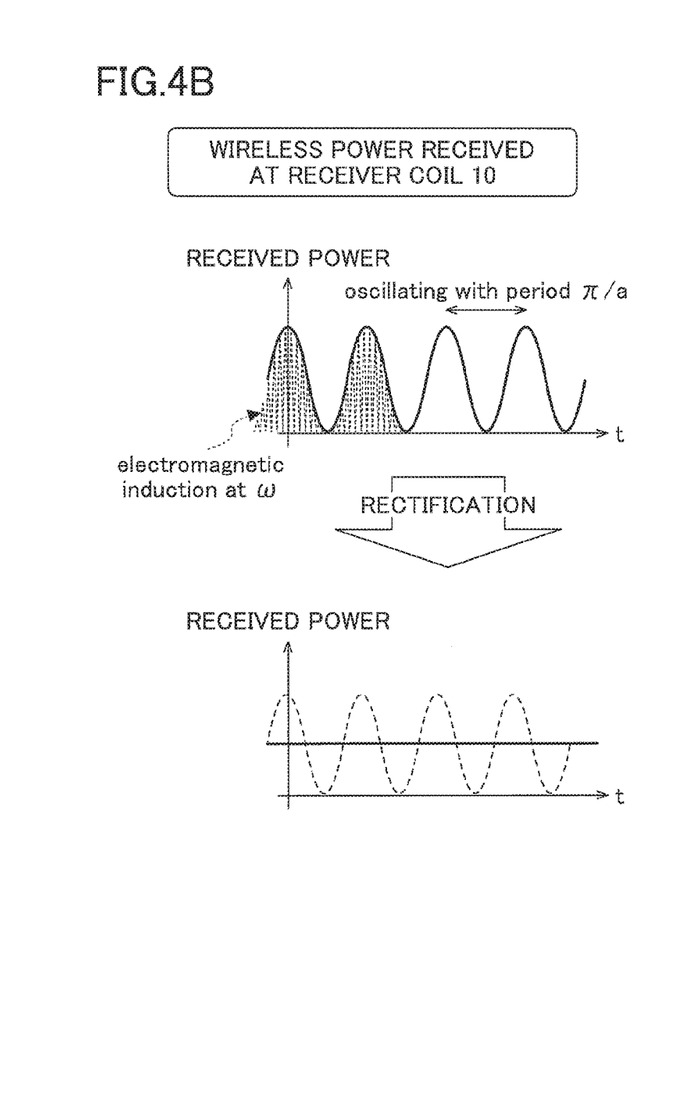
FIG. 4B is a diagram explaining the basic idea of three-dimensional control on the synthetic magnetic field to achieve power reception insensitive to the angle or orientation of the receiver coil.

FIG. 4A and FIG. 4B are diagrams explaining three-dimensional rotation of the synthetic magnetic field vector H according to the embodiment. As illustrated in FIG. 4A, the synthetic magnetic field vector H is controlled so as to rotate within a plane of rotation at an angular frequency (or angular velocity) ω, and simultaneously controlled such that the normal vector $n_{H1}$ to the plane of rotation rotates about an axis of rotation perpendicular to the normal vector $n_{H1}$.

In the example of FIG. 4A, when the synthetic magnetic field vector H rotates within the y-z plane at a certain point of time at angular frequency ω, the normal vector $n_{H1}$ perpendicular to the plane of rotation (i.e., the y-z plane) at that point of time points the x-axis direction.

The synthetic magnetic field vector H is also controlled such that the normal vector $n_{H1}$ to the plane of rotation rotates about the z-axis within the x-y plane in this example, as indicated by the arrow A, at angular frequency "a" (a≤ω). As a result, the synthetic magnetic field vector H that was rotating within the y-z plane at a certain point of time rotates within another plane including the z-axis at next moment of time.

Based upon the example of FIG. 4A, the respective components of the synthetic magnetic field vector H at time t are expressed by equation (1).

$Hx = -H_0 \sin(at) \ast \cos(\omega t),$ $Hy = H_0 \cos(at) \ast \cos(\omega t),$ $Hz = H_0 \sin(\omega t)$     (1)

where $H_0$ denotes the strength of the synthetic magnetic field.

The terms cos ($\omega t$) and sin ($\omega t$) on the right-hand side of equation (1) represent a magnetic field rotating at angular frequency $\omega$, and the terms sin(at) and cos(at) represent that the normal vector $n_{H1}$ perpendicular to the plane of rotation at $\omega$ rotates about the z-axis at angular frequency "a".

Electric current applied to the transmitter coils 21, 22 and 23 (see FIG. 3) are controlled such that the magnetic fields Hx, Hy and Hz produced by the transmitter coils 21, 22 and 23 satisfy equation (1).

FIG. 4B illustrates an alternating current (AC) power induced in the receiver coil 10 when the respective magnetic field components are controlled according to equation (1) and how the oscillating power is rectified to a direct current (DC) power. The AC power induced in the receiver coil 10 is one in which oscillation at angular frequency $\omega$ further oscillates at angular frequency "a" which frequency is equal to or less that $\omega$ (a≤$\omega$).

When the receiver coil 10 is placed such that the normal direction to the coil plane becomes parallel to the y-axis (namely, such that the plane of the receiver coil 10 is within the x-z plane), the electric power received at the receiver coil 10 oscillates with period $\pi$/a. Because the electric power oscillates at twice the angular frequency "a", the period becomes half of 2$\pi$/a. This is due to the fact that the normal vector $n_{H1}$ rotates at angular frequency "a". By smoothing the oscillating electromagnetic field induced in the receiver coil 10, the AC power can be converted to a DC power.

In the embodiment, the system is controlled such that the synthetic magnetic field vector H produced by three transmitter coils 21, 22 and 23 with normal vectors to the coil planes orthogonal to each other rotates at angular frequency $\omega$ within a plane of rotation, and simultaneously, that the normal vector $n_{H1}$ perpendicular to the plane of rotation rotates about an axis of rotation perpendicular to the normal vector $n_{H1}$ at angular frequency "a" equal to or less that $\omega$(a≤$\omega$). Under such control, electric power can be transferred at a stable level regardless of the three-dimensional posture of the receiver coil 10.

Second Embodiment

In the first embodiment, the synthetic magnetic field vector H rotating in a plane (e.g., in the y-z plane) is further rotated about an axis of rotation (e.g., about the z-axis) perpendicular to the normal vector $n_{H1}$ of the plane of rotation of the synthetic magnetic field vector H. The oscillating power induced in the receiver coil 10 is rectified as it is and converted into DC power.

As long as, in the above-explained example, the normal vector to the plane of receiver coil 10 resides in the x-y plane (perpendicular to the z-axis serving as the axis of rotation of the normal vector $n_{H1}$), the received power does not depend on the azimuth angle or the orientation of the receiver coil 10.

However, when the normal to the plane of the receiver coil 10 tilts toward the z direction, the received power level changes depending on the z component of the synthetic magnetic field. This will be explained in more detail, referring to FIG. 5A and FIG. 5B.

Figure 5A:
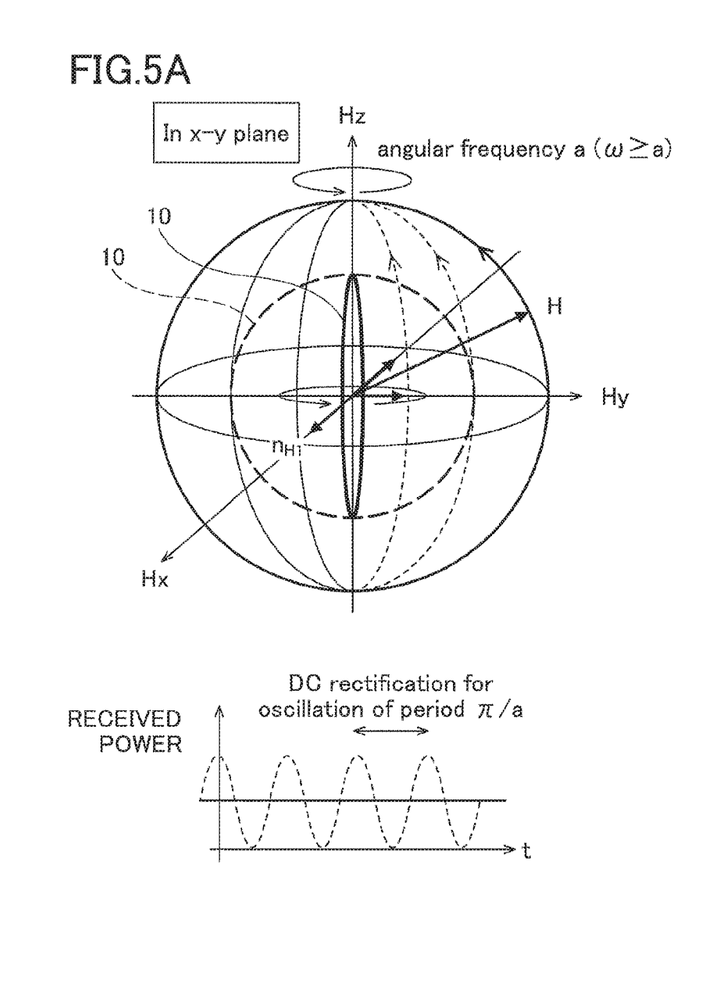
FIG. 5A is a diagram explaining change in received power depending on the z-component of the normal vector of a receiver coil.

As illustrated in FIG. 5A, when the normal to the plane of the receiver coil 10 resides in the x-y plane in which the normal vector $n_{H1}$ perpendicular to the plane of $\omega$-rotation of the synthetic magnetic field vector H exists, the received power always oscillates with period $\pi$/a. By smoothing or rectifying the oscillating power, electric power can be received at a constant level regardless of the azimuth angle or the orientation of the receiver coil 10.

However, when the normal to the plane of the receiver coil 10 tilts toward the z direction, the received power level changes depending on the magnitude of the z component of the normal vector $n_{coil}$ of the receiver coil 10. As the z component of the normal vector $n_{coil}$ of the receiver coil 10 increases, the oscillation of period $\pi$/a of the received power decreases while DC power component increases.

Figure 5B:
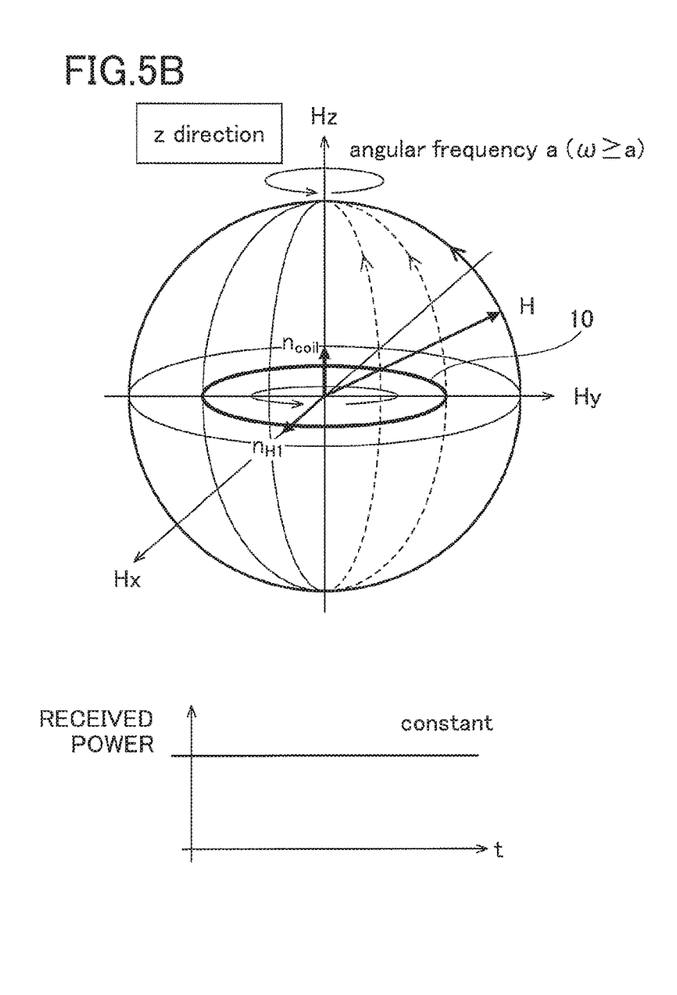
FIG. 5B is a diagram explaining change in received power depending on the z-component of the normal vector to the plane of a receiver coil.

When the normal vector $n_{coil}$ of the receiver coil 10 becomes parallel to the z-axis, namely when the receiver coil 10 is located in the x-y plane as illustrated in FIG. 5B, the received power level becomes the maximum. This maximum power level is twice the rectified DC power acquired in the configuration of FIG. 5A, in which configuration the normal vector $n_{coil}$ of the receiver coil 10 is within the x-y plane. This is because the amplitude of the magnetic flux passing through the plane of the receiver coil 10 does not change even if the normal vector $n_{H1}$ to the plane of rotation at angular frequency $\omega$ of the synthetic magnetic field vector H is further rotated about the z-axis at angular frequency "a" (a≤$\omega$). In FIG. 5A, the magnetic flux penetrating the coil plane is oscillating, and the amplitude of this oscillation further oscillates with period $\pi$/a. Accordingly, the received power level is rectified. On the other hand, in FIG. 5B, the received power level becomes constant without oscillation of period $\pi$/a.

There may be no significant impact on a power receiver capable of receiving electric power without limits even if the received power level increases over a predetermined level depending on the three-dimensional posture or tilting of the receiver coil 10 or on the change in the z component of the normal vector $n_{coil}$ of the receiver coil 10. However, charging level is typically limited in electrical equipment or appliance. Upon excessive quantity of electric power being supplied, the equipment or appliance may be affected adversely.

To avoid such situation, the second embodiment prevents the wirelessly transferred power level from varying depending on the three-dimensional posture, especially on the z component of the normal vector $n_{coil}$ in this example, of the receiver coil 10. The z component of the normal vector $n_{coil}$ may be generalized as a component in the direction of a rotation axis about which the normal vector $n_{H1}$ perpendicular to the plane of rotation of the synthetic magnetic field vector H rotates.

Figure 6:
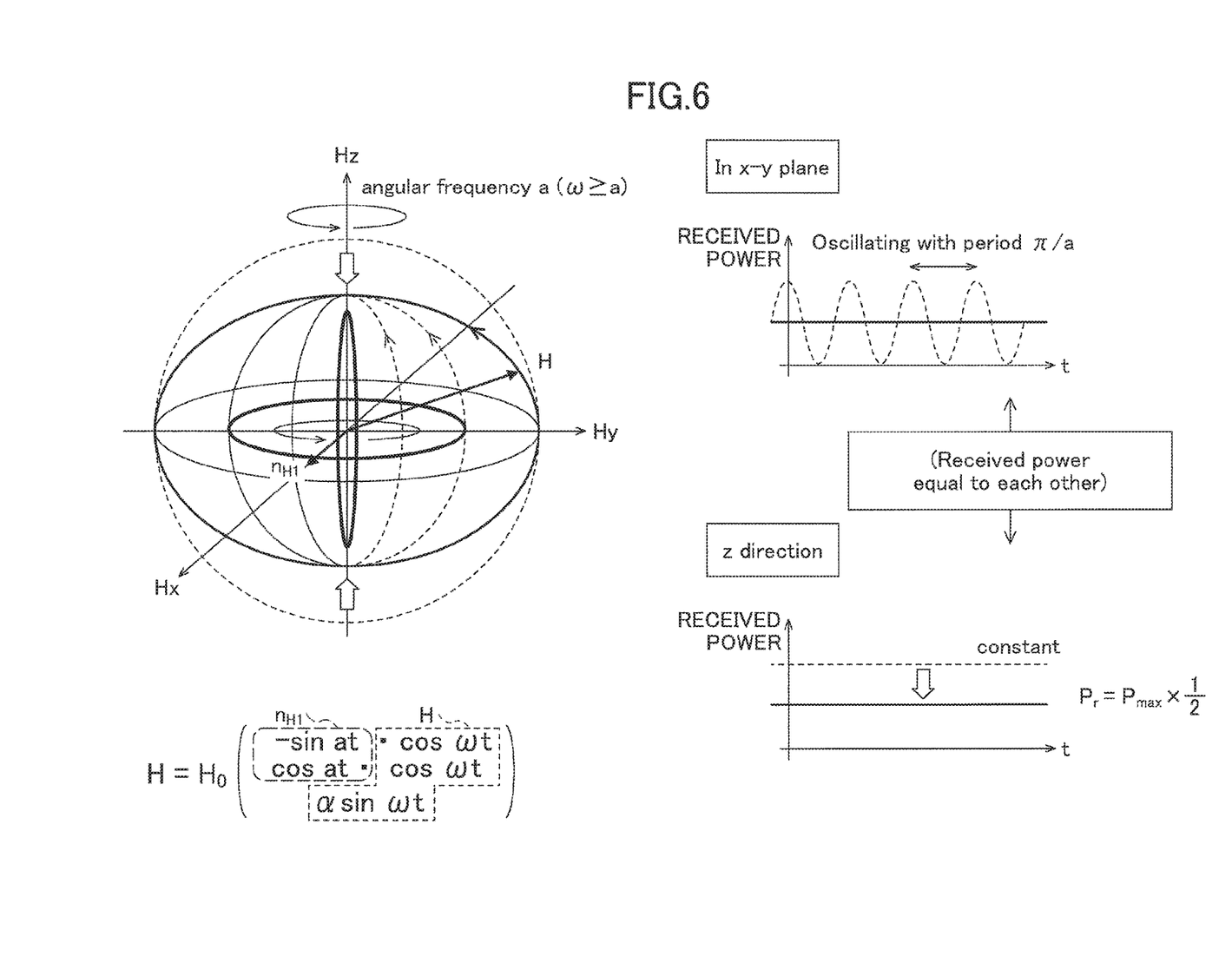
FIG. 6 is a diagram explaining three-dimensional control on the synthetic magnetic field, achieving power reception at a constant level regardless of the angle or orientation of a receiver coil.

FIG. 6 illustrates three-dimensional control on the synthetic magnetic field for achieving power reception at a constant and appropriate level regardless of the three-dimensional posture of the receiver coil 10. The received power is proportional to the square of the electromagnetically induced electric current. In order to make the received power constant regardless of the posture of the receiver coil 10, a magnetic field component parallel to the rotation axis of the normal vector $n_{H1}$ is multiplied by 1/$\sqrt{2}$. In this example, the magnetic field component Hz in the z-axis direction, which component is normal to the plane of rotation of the normal vector $n_{H1}$ of the synthetic magnetic field vector H, is multiplied by 1/$\sqrt{2}$.

The respective components at time t of the synthetic magnetic field vector H are expressed by equation (2).

$$Hx = -H_0 \sin(at) * \cos(\omega t),$$

$$Hy = H_0 \cos(at) * \cos(\omega t),$$

$$Hz = \alpha * H_0 \sin(\omega t) \quad (2)$$

where $H_0$ denotes the strength of the synthetic magnetic field and α denotes an adjusting factor. In the second embodiment, α is equal to $1/\sqrt{2}$ ($\alpha=1/\sqrt{2}$). In the first embodiment, α is equal to 1 ($\alpha=1$) and equation (1) is used. With this arrangement, a power receiver can receive a constant power at an appropriate level regardless of the three-dimensional posture of the receiver coil 10. In the second embodiment, the magnetic field component in the direction of the rotation axis (e.g., in the z-axis direction) about which the normal vector $n_{H1}$ to the plane of rotation of the synthetic magnetic field vector H is regulated so as to be $1/\sqrt{2}$ times the magnetic field component in the plane of rotation (e.g., in the x-y plane) of the normal vector $n_{H1}$. Consequently, the received power level can be made uniform even if the angle of the receiver coil 10 changes in an arbitrary direction.

<System Structure>

Figure 7:
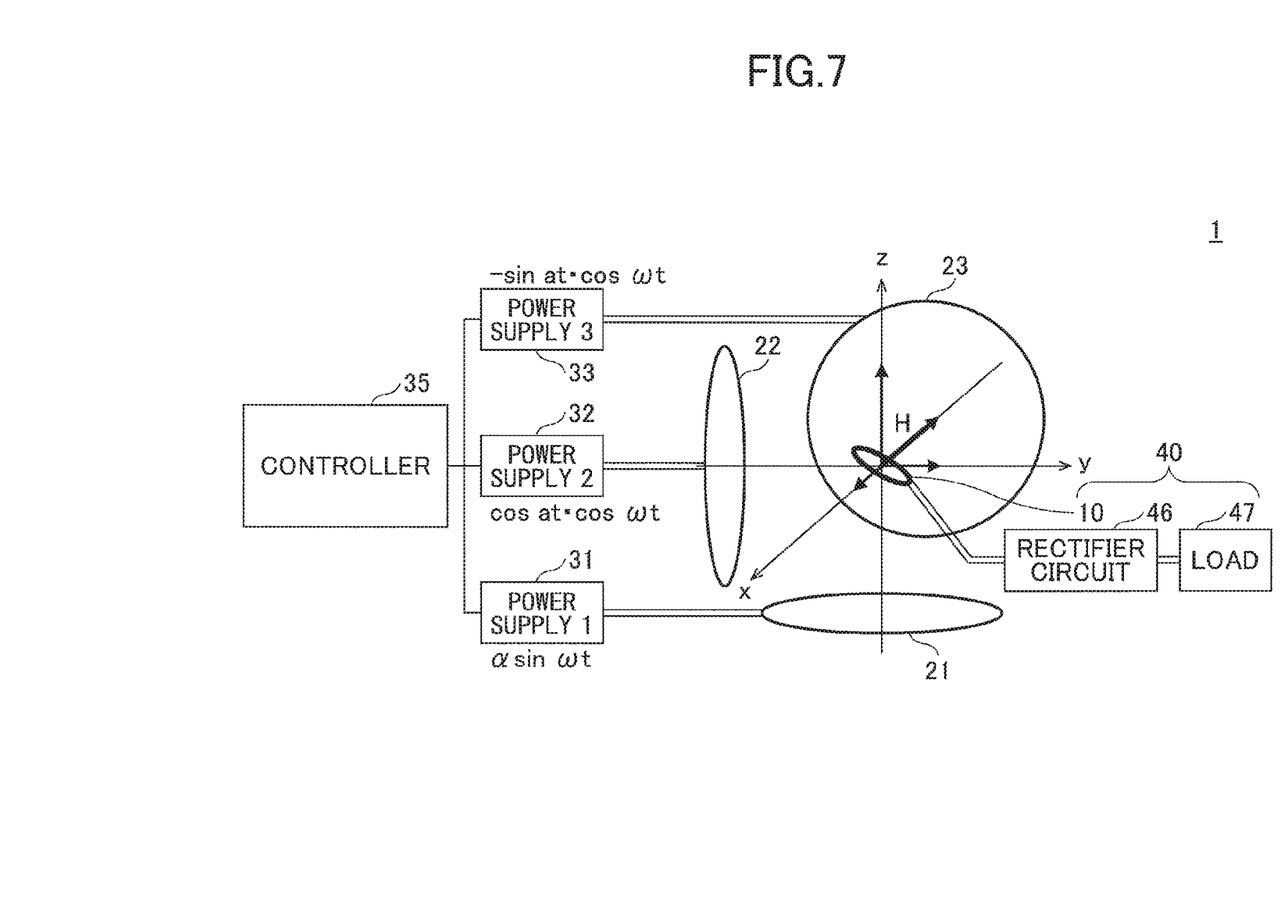
FIG. 7 is a schematic diagram of a wireless power transfer system according to the embodiment.

FIG. 7 is a schematic diagram of a wireless power transfer system 1 according to an embodiment. The wireless power transfer system 1 has three transmitter coils 21, 22 and 23 arranged such that the normal lines to the planes of these coils are orthogonal to each other, and power sources 31, 32 and 33 connected to the transmitter coils 21, 22 and 23, respectively, to supply electric currents. The wireless power transfer system 1 also has a controller 35 that controls the quantities of the electric currents output from the power sources 31, 32 and 33.

The controller 35 controls the power sources 31, 32 and 33 such that the synthetic magnetic field H produced by the transmitter coils 21, 22 and 23 rotates at angular frequency ω, and that the normal vector $n_{H1}$ to the plane of rotation also rotates at angular frequency "a" (a≤ω) about an axis perpendicular to the normal vector $n_{H1}$.

To be more precise, the controller 35 perform following controls on the respective power sources.

(a) controlling power source 33 such that the magnetic field produced by the transmitter coil 23 in the first direction (e.g., the x direction) changes with time in proportion to −sin(at)*cos(ωt) (or at −$H_0$*sin(at)*cos(ωt));

(b) controlling power source 32 such that the magnetic field produced by the transmitter coil 22 in the second direction (e.g., the y direction) orthogonal to the first direction changes with time in proportion to cos(at)*cos(ωt) (or at $H_0$*cos(at)*cos(ωt)); and (c) controlling power source 31 such that the magnetic field produced by the transmitter coil 21 in the third direction (e.g., the z direction) orthogonal to the first and second directions changes with time in proportion to α*sin(ωt) (or at α*$H_0$*sin(ωt)).

In other words, the power sources 31, 32 and 33 are controlled such that the synthetic magnetic field vector H received at the receiver coil 10 satisfies equation (2). It is preferable that α is equal to $1/\sqrt{2}$.

Figure 8:
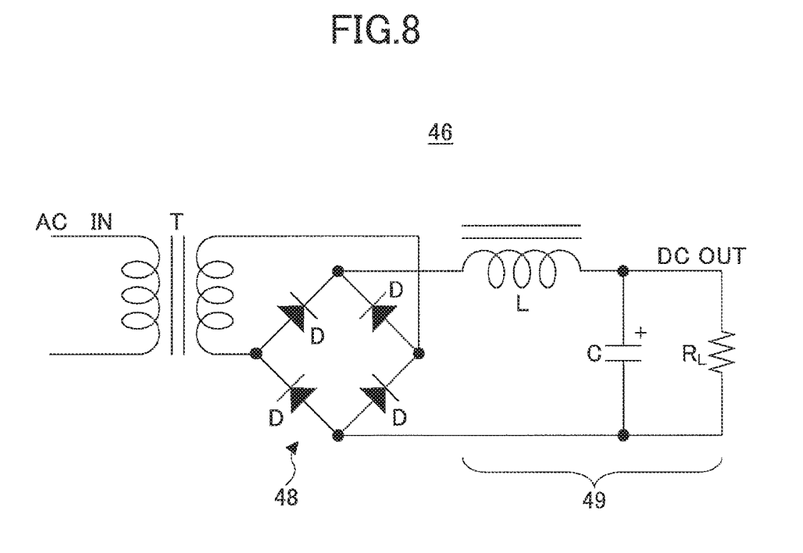
FIG. 8 is a circuit diagram of a rectifier circuit used in a power receiver.

The wireless power transfer system 1 can transfer electric power to an arbitrary type of power receiver 40 that changes its posture in a three-dimensional manner. The power receiver 40 may be a general and common power receiver that has a receiver coil 10, a rectifier circuit 46 and a load 47. The rectifier circuit 46 may be a typical rectifier/filter circuit illustrated in FIG. 8. The oscillating current input to the rectifier circuit 46 are rectified by a diode bridge circuit 48 and smoothed by a low-pass filter 49 into a direct current.

The wireless power transfer system 1 is capable of transferring electric power or energy regardless of the three-dimensional posture (orientation) of the receiver coil 10, without detection of the posture of the receiver coil 10 or associated control operations according to the detection result. The system structure is simplified and costs can be reduced.

For example, in the first embodiment, the display (or the cover) of a lap-top computer can be rotated about an axis perpendicular to the main body or pivoted to and from the main body at an arbitrary posture in the space in which the wireless power transfer system 1 is set up. A power receiver 40 installed in the cover part of the lap-top computer always receives electric power at a constant level equal to or higher than a predetermined level regardless of the posture of the lap-top computer.

In the second embodiment, a mobile terminal such as a smart phone or a tablet can be held in an arbitrary direction at an arbitrary angle during wireless power transfer. A constant level electric power can be transferred to the mobile terminal within the acceptable charging range, regardless of the three-dimensional posture of the mobile terminal.

The wireless power transfer system 1 is applicable to both a magnetic resonance coupling scheme and electromagnetic induction scheme. From the viewpoint of wirelessly transferring electric power to a power receiver that changes its posture three-dimensionally, magnetic resonance coupling scheme that can transfer power to a receiver coil positioned several meters from a transmitter coil is desired. Magnetic resonance coupling is also advantageous in terms that devices to be wirelessly powered and recharged can be limited by adjusting the resonant frequency.

Although in the embodiments explanation is made using Cartesian coordinates with mutually perpendicular coordinate axes (the x-axis, the y-axis, and the z-axis), these axes are not absolute ones, but relative axes taken in arbitrary directions as long as the mutual orthogonality is maintained.

All examples and conditional language provided herein are intended for the pedagogical purpose of aiding the reader in understanding the invention and the concepts contributed by the inventor to further the art, and are not to be construed as limitations to such specifically recited examples and conditions, nor does the organization of such examples in the specification relate to a showing of superiority or inferiority of the invention. Although one or more embodiments of the present invention have been described in detail, it should be understood that the various changes, substitutions, and alterations could be made hereto without departing from the spirit and scope of the invention.

What is claimed is:

1. A wireless power transfer system comprising:

a first transmitter coil, a second transmitter coil, and a third transmitter coil arranged such that normal directions to planes of the first, the second and the third transmitter coils are orthogonal to each other in a three-dimensional space, and a controller that controls electric currents supplied to the first transmitter coil, the second transmitter coil and the third transmitter coil such that a synthetic magnetic field vector produced by the first transmitter coil, the second transmitter coil and the third transmitter coil rotates in a plane of rotation at a first angular frequency "ω", and that a normal vector to the plane of rotation rotates about an axis of rotation perpendicular to the normal vector at a second angular frequency "a" equal to or smaller than the first angular frequency, wherein the controller controls a first power source connected to the first transmitter coil to modulate a non-oscillating magnitude ($H_0$) of a magnetic field vector with −sin(at)*cos(ωt), controls a second power source connected to the second transmitter coil to modulate the non-oscillating magnitude ($H_0$) of the magnetic field vector with $\cos(at)*\cos(\omega t)$, and controls a third power source connected to the third transmitter coil to modulate the non-oscillating magnitude ($H_0$) of the magnetic field vector with $\alpha*\sin(\omega t)$, and wherein a point of the synthetic magnetic field vector continuously moves on a sphere or a spheroid.

2. The wireless power transfer system as claimed in claim 1,
wherein the controller controls a strength of a magnetic field component along a direction parallel to the axis of rotation of the normal vector to $1/\sqrt{2}$ times the original strength to make a received power constant.

3. The wireless power transfer system as claimed in claim 1,
wherein the controller controls the first power source such that a first magnetic field component produced by the first transmitter coil in a first direction changes with time in proportion to $-\sin(at)*\cos(\omega t)$, controls the second power source such that a second magnetic field component produced by the second transmitter coil in a second direction perpendicular to the first direction changes with time in proportion to $\cos(at)*\cos(\omega t)$, and controls the third power source such that a third magnetic field component produced by the third transmitter coil in a third direction perpendicular to the first direction and the second direction changes with time in proportion to $\alpha*\sin(\omega t)$, where $\alpha$ is equal to 1 or $1/\sqrt{2}$ ($\alpha=1$ or $1/\sqrt{2}$).

4. The wireless power transfer system as claimed in claim 1,
wherein the wireless power transfer system is configured to transfer electric power to a power receiver with a receiver coil that has a same resonant frequency as the first transmitter coil, the second transmitter coil, and the third transmitter coil.

5. The wireless power transfer system as claimed in claim 4,
wherein an electric power oscillating with period $\pi/a$ is transferred to the receiver coil.

6. A wireless power transfer method comprising:
setting a first transmitter coil, a second transmitter coil, and a third transmitter coil such that normal directions to planes of the first, the second and the third transmitter coils are orthogonal to each other in a three-dimensional space;
placing a power receiver in the three-dimensional space formed by the first transmitter coil, the second transmitter coil, and the third transmitter coil; and
controlling electric currents supplied to the first transmitter coil, the second transmitter coil and the third transmitter coil such that a synthetic magnetic field vector produced by the first transmitter coil, the second transmitter coil and the third transmitter coil rotates in a plane of rotation at a first angular frequency "$\omega$", and that a normal vector to the plane of rotation rotates about an axis of rotation perpendicular to the normal vector at a second angular frequency "a" equal to or smaller than the first angular frequency,
wherein the controller controls a first power source connected to the first transmitter coil to modulate a non-oscillating magnitude ($H_0$) of a magnetic field vector with $-\sin(at)*\cos(\omega t)$, controls a second power source connected to the second transmitter coil to modulate the non-oscillating magnitude ($H_0$) of the magnetic field vector with $\cos(at)*\cos(\omega t)$, and controls a third power source connected to the third transmitter coil to modulate the non-oscillating magnitude ($H_0$) of the magnetic field vector with $\alpha*\sin(\omega t)$, and wherein a point of the synthetic magnetic field vector continuously moves on a sphere or a spheroid.

7. The wireless power transfer method as claimed in claim 6,
wherein a strength of a magnetic field component along a direction parallel to the axis of rotation of the normal vector is controlled to $1/\sqrt{2}$ time the original strength to make a received power constant.

8. The wireless power transfer method as claimed in claim 6, further comprising:
controlling the first power source such that a first magnetic field component produced by the first transmitter coil in a first direction changes with time in proportion to $-\sin(at)*\cos(\omega t)$;
controlling the second power source such that a second magnetic field component produced by the second transmitter coil in a second direction perpendicular to the first direction changes with time in proportion to $\cos(at)*\cos(\omega t)$; and
controlling the third power source such that a third magnetic field component produced by the third transmitter coil in a third direction perpendicular to the first direction and the second direction changes with time in proportion to $a*\sin(\omega t)$, where a is equal to 1 or $1/\sqrt{2}$ ($\alpha=1$ or $1/\sqrt{2}$).

9. The wireless power transfer method as claimed in claim 6,
wherein a resonant frequency of a receiver coil of the power receiver is the same as that of the first transmitter coil, the second transmitter coil, and the third transmitter coil.

10. The wireless power transfer method as claimed in claim 9, further comprising:
receiving at the power receiver an electric power oscillating with period $\pi/a$.

11. The wireless power transfer system as claimed in claim 1,
wherein the non-oscillating magnitude of the synthetic magnetic field vector is constant in all directions, and the synthetic magnetic field vector with a constant magnitude rotates at the first angular frequency "$\omega$".

12. The wireless power transfer system as claimed in claim 1,
wherein the non-oscillating magnitude of the synthetic magnetic field vector is multiplied by a for the third magnetic vector component, and a locus of the synthetic magnetic field vector moves on the spheroid.

13. The wireless power transfer method as claimed in claim 6,
wherein the non-oscillating magnitude of the synthetic magnetic field vector is constant in all directions, and the synthetic magnetic field vector with a constant magnitude rotates at the first angular frequency "$\omega$".

14. The wireless power transfer method as claimed in claim 6,
wherein the non-oscillating magnitude of the synthetic magnetic field vector is multiplied by a for the third magnetic vector component, and a locus of the synthetic magnetic field vector moves on the spheroid.

* * * * *